(12) United States Patent
Schmidt

(10) Patent No.: US 7,584,829 B2
(45) Date of Patent: Sep. 8, 2009

(54) DAMPING VALVE DEVICE WITH PROGRESSIVE DAMPING FORCE

(75) Inventor: Klaus Schmidt, Odenthal (DE)

(73) Assignee: Thyssenkrupp Bilstein Suspension GmbH, Ennepetal (DE)

( * ) Notice: Subject to any disclaimer, the term of this patent is extended or adjusted under 35 U.S.C. 154(b) by 0 days.

(21) Appl. No.: 11/508,811

(22) Filed: Aug. 23, 2006

(65) Prior Publication Data

US 2007/0068753 A1    Mar. 29, 2007

(30) Foreign Application Priority Data

Sep. 27, 2005    (DE)   ........................ 10 2005 046 276

(51) Int. Cl.
 *F16F 9/34* (2006.01)
(52) U.S. Cl. .................. 188/322.15; 188/280
(58) Field of Classification Search ............ 188/322.15, 188/281, 282.1, 282.5, 282.6, 280, 322.22
 See application file for complete search history.

(56) References Cited

U.S. PATENT DOCUMENTS

| 4,782,925 | A | * | 11/1988 | Grundei | .................. 188/322.14 |
| 5,316,113 | A | * | 5/1994 | Yamaoka | .................. 188/282.6 |
| 5,738,190 | A | | 4/1998 | Deferme | |
| 6,085,876 | A | | 7/2000 | Deferme | |
| 6,089,142 | A | | 7/2000 | Adrian et al. | |

(Continued)

FOREIGN PATENT DOCUMENTS

DE         40 25 115        2/1992

(Continued)

OTHER PUBLICATIONS

English translation of German Patent Document DE 4025115.*

*Primary Examiner*—Robert A Siconolfi
*Assistant Examiner*—Vu Q Nguyen
(74) *Attorney, Agent, or Firm*—Jordan and Hamburg LLP

(57) ABSTRACT

A hydraulic vibration damper has a receiving pipe, a piston rod which projects into the receiving pipe at one end and which can be moved in an oscillating way in the receiving pipe, on the end, facing the receiving pipe, of which a working piston is disposed. The working piston comprises through-flow channels for the damping fluid which channels are effective in the pulling direction and pushing direction, and which working piston divides the inner chamber of the receiving pipe into a pulling chamber on the side of the piston rod and a pressure chamber remote from the piston rod, wherein at least a first through-flow channel can be covered to form a damping valve with a first resilient or spring-loaded valve washer which cooperates with a first valve seat. A pressure relief blow-off valve which comprises a blow-off function and opens when a predeterminable pressure level is achieved, has a first throttling site which produces progressively flowing damping force when there is increasing piston speed and whose throttling cross-section is variable depending on the piston speed of the vibration damper. In order to achieve a structurally simple construction and a low axial construction height of the valve, the pressure relief valve which has the blow-off function comprises a first annular washer allocated to the first valve washer, the first annular washer having a surface facing the first valve washer, the surface forming the variable first throttling site with the first valve washer.

12 Claims, 6 Drawing Sheets

U.S. PATENT DOCUMENTS

| | | | |
|---|---|---|---|
| 6,276,498 B1 * | 8/2001 | Kirchner | 188/282.5 |
| 6,371,264 B1 | 4/2002 | Deferme | |
| 2005/0056505 A1 * | 3/2005 | Deferme | 188/322.15 |
| 2005/0115786 A1 * | 6/2005 | Forster | 188/322.15 |
| 2005/1026336 * | 12/2005 | Katou et al. | 188/322.22 |

FOREIGN PATENT DOCUMENTS

| | | |
|---|---|---|
| DE | 197 10 454 | 10/1997 |
| DE | 197 55 994 | 7/1999 |
| DE | 100 28 114 | 12/2000 |
| DE | 10 2004 050 732 | 6/2005 |
| DE | 100 2004 050 732 | 6/2005 |

\* cited by examiner

Range 1

Range 2

DAMPING VALVE DEVICE WITH PROGRESSIVE DAMPING FORCE

The invention relates to a hydraulic vibration damper.

Such a vibration damper is known from DE 10 2004 050 732 A1. In order to maintain a high damping force when the vibration damper has high working piston speeds, it is desirable to construct the valve devices of the vibration damper so that when there are high working piston speeds the progress of the damping force increases progressively along with the increasing working piston speed. The increasing damping force ensures that the damping speed is reduced before reaching the end stops in order to decrease the stop forces. Both mechanical wear and tear or deformation as well as undesirable noise development during operation would be associated with this stopping.

In order to achieve a damping force that increases progressively with the working piston speed, a damping valve device is proposed in DE 10 2004 050 732 A1, the said damping valve device comprising a first damping valve that is changed to a through-passage operating position in a first operating range with increasing through-flow rate of a damping medium, whereby a second operating range with a progressive damping force characteristic is influenced by a throttling site in connection with a control slide valve, the said control slide valve having the ability to be changed to a closed position. The control slide valve thus has a pressure-influenced surface which affects the control slide valve depending upon the flow rate of the damping medium in closed position. With this solution, a separate control slide valve is thus necessary in addition to the damping valves of the working piston or of the bottom valve. This separate control slide valve cooperates either with the body of the working piston or with the body of the bottom valve and forms therewith a throttling site. The through-flow cross-section of this throttling site becomes smaller as the working piston speed increases so that the damping force of the vibration damper progressively increases. If a specific critical value of the through-flow cross-section of the throttling site is achieved, then the pressure in the vibration damper increases to a critical value and when this is achieved, a pressure relief valve, which has a so-called blow-off function, opens, so that the progressive increase in damping force is stopped and the damping force does not increase any further but remains at the high level achieved.

A disadvantage of this known vibration damper is that the structural design of the valve device is expensive because of the separate slide valve that is required, and this design is thus also associated with comparatively high costs. In addition, the separate slide valve requires a relatively large construction height in the axial direction for the valve device.

It is the object of the invention to provide a vibration damper having a simple construction and with the valve device that affects the progressive damping force having a small construction height in the axial direction.

In the case of the invention, the variable throttling site which, as the working piston speed increases, reduces its through-flow cross-section for the damping medium and thus ensures that the damping force increases progressively, is formed directly between the valve washer that determines the damping force during normal operation on the one hand, and an annular washer that cooperates with this valve washer on the other hand. Normal operation is understood to be, in this connection, an operating range in which there are comparatively low working piston speeds of up to 2 m/sec, with a maximum of up to 4 m/sec, however. These speed ranges must not be taken to be fixed ranges and they can indeed be adjusted by changing the component parts.

The pressure relief valve comprising a blow-off function has in accordance with the invention an annular washer which is allocated to the valve washer of the damping valve, which for its part comprises a surface area facing the valve washer. This surface area forms a variable throttling site with the valve washer and this throttling site ensures a progressive increase of the damping force of the vibration damper when there are high working piston speeds upwards of about 2 m/sec. As traditional hydraulic vibration dampers require in any case the valve washer of the damping valve to adjust the desired damping feature of the vibration damper, only the additional annular washer, which belongs to the blow-off valve of the vibration damper, is required to form the desired variable throttling site. A separate component part in the form of a control slide valve, which is activated by the flowing damping medium (cf. DE 10 2004 050 732 A1), is not required. The valve device in accordance with the invention is thus of a very small construction in the axial direction. Moreover, the construction costs of realising the variable throttling site are extremely low so that the design of the complete valve device is structurally simple and thus inexpensive.

The valve device in accordance with the invention and with which the variable throttling site is created can be formed on the working piston of the vibration damper. If this concerns a vibration damper with a bottom valve that works on the two-chamber operating principle, then the valve device in accordance with the invention can be provided either only on the working piston or only on the bottom valve, or both on the working piston as well as on the bottom valve.

The valve device in accordance with the invention can be formed in an advantageous manner as a valve device that is effective exclusively in the pushing stage of the vibration damper. It is, furthermore, also conceivable to design the valve device in accordance with the invention as a valve device that is effective exclusively in the pulling stage of the vibration damper. Moreover, it is also conceivable that the valve device in accordance with the invention is effective in both directions of movement of the working piston (that is, in both the pulling stage and the pushing stage).

In the case of the valve device in accordance with the invention the blow-off valve is formed as a spring-loaded pressure relief valve. It is preferable that the blow-off valve comprises a cylindrical cover with a radial step disposed on its interior wall which extends inwards, that is, to the middle of the vibration damper. This step forms an abutment for the annular washer which forms the variable throttling site with the valve washer.

In order to obtain a small axial construction height of the valve device, the design is such that a spring washer is disposed within the cover and above the radial step, this spring washer preloading the pressure relief valve in a closed direction with a predetermined resilient force. The prestressing with which this spring washer is built within the cover of the pressure relief valve can be used to establish at what pressure the pressure relief valve will open so as to achieve the blow-off effect. A helical spring, or even a combination of a spring washer and a helical spring, can of course be used as an alternative to the spring washer.

The invention avails itself of the knowledge that the opening movement of the valve washer, which in the normal operation of the vibration damper determines its damping characteristic, can be used to form a variable throttling site in interaction with a component part of a blow-off valve with which throttling site a progressive damping force can be achieved in the range of higher working piston speeds when there are increasing working piston speeds. Additional component parts, such as, for example, control slide valves for forming these variable throttling sites, can thus be dispensed with, and this leads to a construction of the valve device that is simple and leads also, therefore, to low manufacturing costs. In addition, a low axial elevation height of the valve is achieved.

The invention is described below in more detail with reference to the drawings. The details shown are:

DESCRIPTION OF THE PREFERRED EMBODIMENTS

Figure 1:
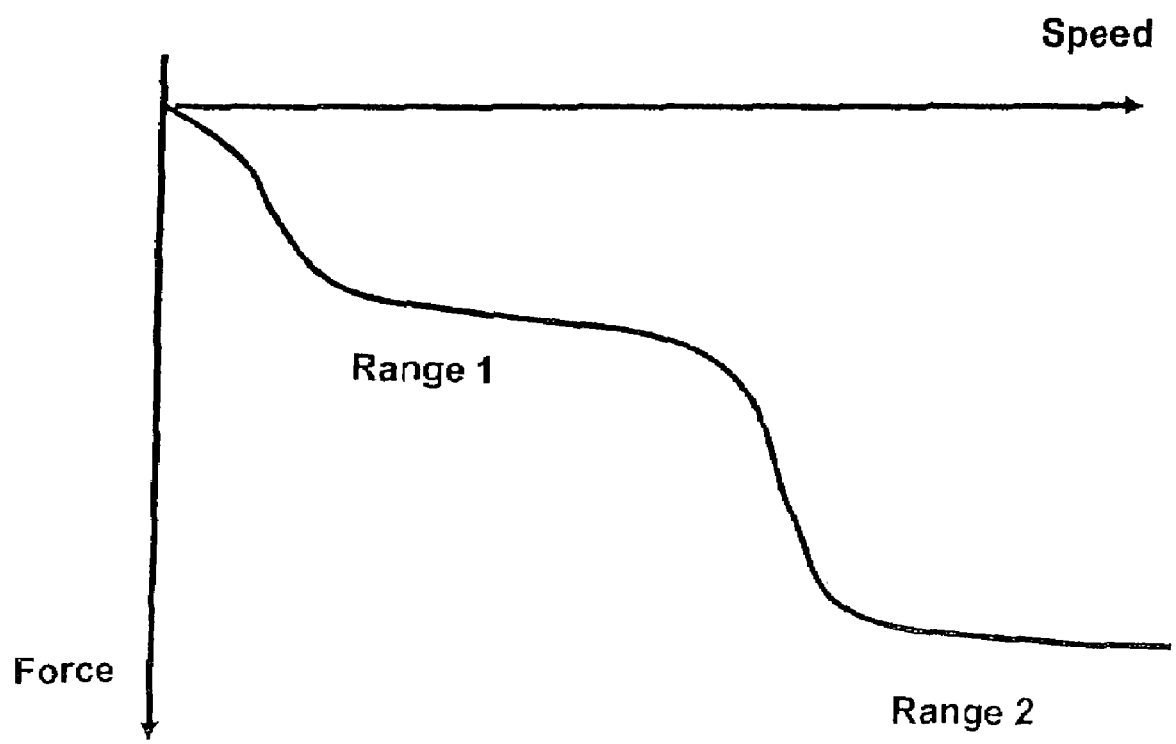
FIG. 1 is a diagram in which the damping force is illustrated over the working piston speed.

In FIG. 1 the damping force of a vibration damper in accordance with the invention is plotted over the working piston speed. The range of the damping force referred to as 'Range 1' is the range which is present in the normal operation of the vibration damper when working piston speeds are of up to about 2 m/sec. In this range the damping force of the vibration damper is determined by one or several resilient or spring-loaded valve washers. If the working piston speed increases further, then the damping force is changed in a way that is desired to a damping force that progressively increases. 'Damping force that progressively increases' means that as the working piston speeds increase, the damping force of the vibration damper also increases. In this way, the damping speed is reduced before the end stops are reached so as to reduce the stop forces and to avoid the damage associated with a stop and/or the undesired development of noise.

If the working piston speed continues to increase, however, and achieves a critical value, then the valve device in accordance with the invention initiates its blow-off function, so that the curve of the damping force that is progressively increasing moves into the flat range 2 in which there is no further increase of the damping force that is worthy of mention. In this way, a pressure level that is too high is prevented from forming in the vibration damper, so that the vibration damper is thereby prevented from cracking. At the same time a high level of damping force of the vibration damper is maintained.

Figure 2A:
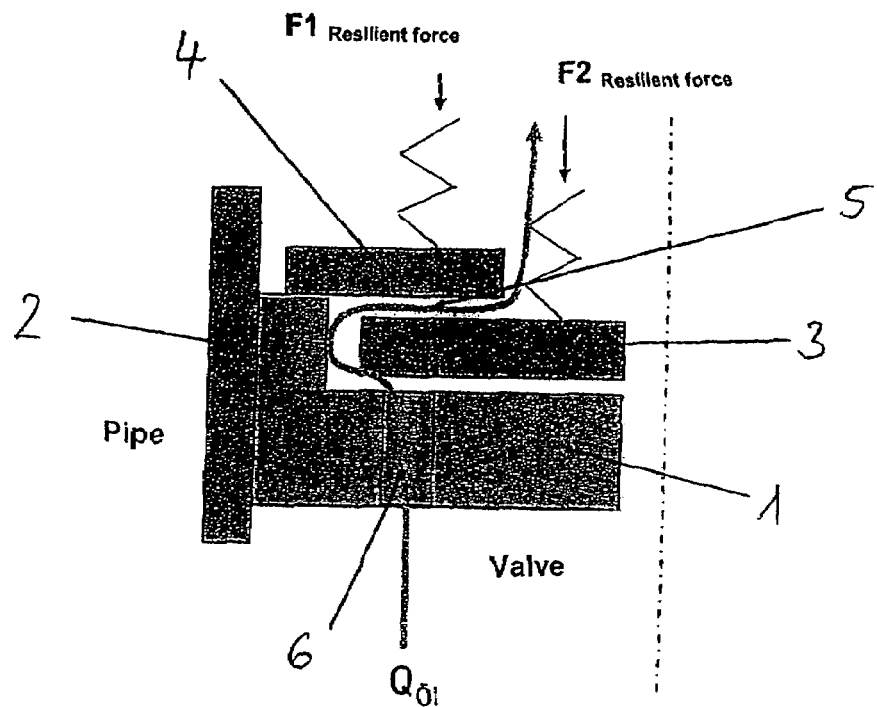
FIGS. 2a, 2b are diagrammatic illustrations of the operating principle of the valve device in accordance with the invention.

In FIG. 2a the functional principle of the valve device in accordance with the invention is illustrated diagrammatically during normal operation. Of note is the working piston (1) which is disposed in a receiving pipe (2) of a vibration damper in an oscillating and movable manner. A valve washer (3) that is spring-loaded with a resilient force $F2_{resilient\ force}$ cooperates with the working piston (1), and this valve washer (3) cooperates with a valve seat that is formed on the body of the working piston (1). This spring-loaded valve washer (3) forms the damping valve that is effective in the compression stroke of the damper in the pushing stage that is illustrated in FIG. 2a.

In addition, a pressure relief valve (4) loaded by a second resilient force $F1_{resilient\ force}$ is illustrated and this pressure relief valve (4) cooperates likewise with a valve seat surface on the body of the working piston (1) and is illustrated in FIG. 2a in a closed state. A variable throttling site (5) is formed between the valve washer (3) and the pressure relief valve (4), through which variable throttling site (5) the liquid damping medium flows in the normal operating state shown in FIG. 2.

The damping force of the vibration damper changes depending on the size of the through-flow cross-section surface of the variable throttling site (5). On the one hand, the valve washer (3) only opens then when the pressure in the vibration damper is so great that the force of the damping medium that affects the valve washer (3) is greater than the resilient force $F2_{resilient\ force}$ that affects the spring F2 on the valve washer. If the valve washer (3) has been raised because of a corresponding pressure increase in the damping medium, then the liquid damping medium will flow through the through-flow channel (6) of the working piston and the variable throttling site (5) which is adjacent thereto and which throttling site (5) is formed between the valve washer (3) and the pressure relief valve (4). If the speed of the working piston continues to increase, then the pressure in the vibration damper will also continue to increase, whereby the valve washer (3) is moved further against its resilient force onto the blow-off valve (4) and further reduces the freely through-flowable cross-section surface of the throttling site (5). In this way the damping force of the vibration damper continues to increase with an ever-increasing reduction of the freely through-flowable cross-section surface of the throttle position (5), so that the desired progressive damping force is achieved.

Figure 2B:
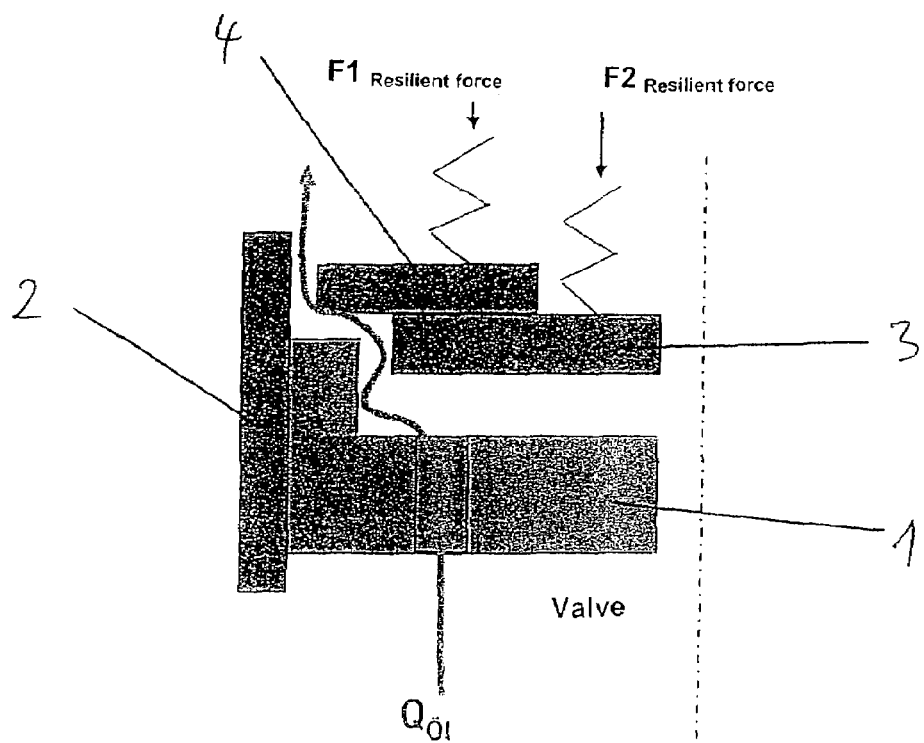

As soon as the freely through-flowable cross-section surface of the throttling site (5) achieves a critical mass at which the throttling site (5) has a certain critical flow resistance, then the pressure in the vibration damper will also achieve a critical value, at which the pressure relief valve (4) opens so that the blow-off function of this pressure relief valve (4) is deployed. In FIG. 2b this is shown diagrammatically in a way that shows that the valve washer (3) is positioned on the pressure relief valve and the pressure relief valve (4) has risen as a consequence of the increase in pressure from the body of the working piston (1) so that a through-flow channel (blow-off channel) for the liquid damping medium is opened. In this operating condition the damping force of the vibration damper does not increase further but it remains almost constantly at a high level of damping force. In this way the critical value of the vibration damper pressure cannot be exceeded and the vibration damper will thus not crack.

Figure 3:
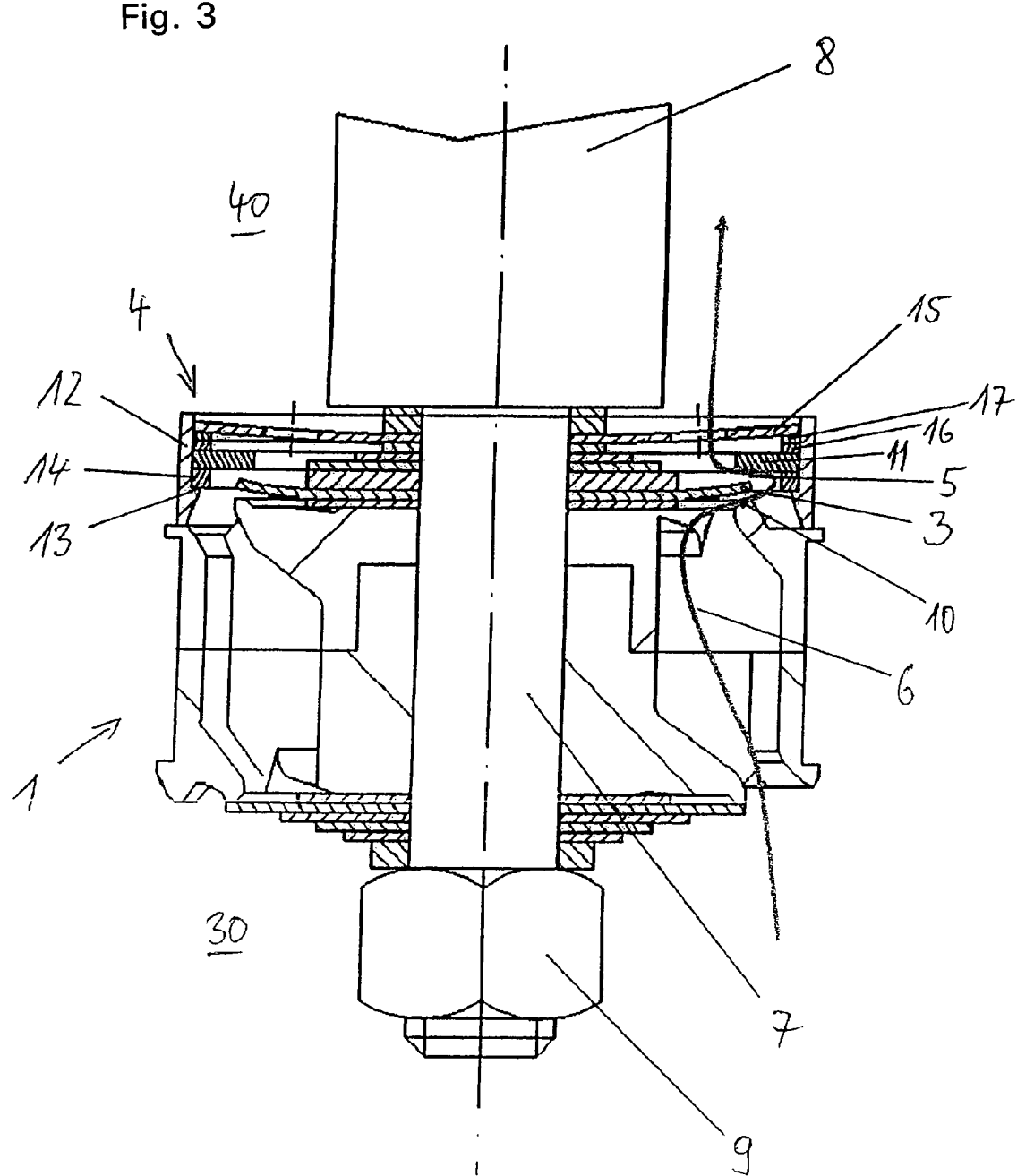
FIG. 3 shows a valve device in accordance with the invention on the working piston in a first operating state (normal operation)

In FIG. 3 a working piston (1) fitted with a valve device in accordance with the invention is illustrated, which working piston (1) is disposed on the piston rod pin (7), which is reduced in diameter, of a piston rod (8). The working piston (1) is thus screwed in a known way with a nut (9) to the piston rod pin (7). The working piston (1) has a flow channel (6) for the liquid damping medium. The flow channel (6) can thus be covered by a valve washer (3) which is combined with a valve seat (10) which is formed on the body of the working piston (1). This valve washer (3) determines the damping force of the working piston in the pushing stage in the normal operating conditions shown in FIG. 3. The valve washer (3) is supported in a known way by a spring washer bundle which is supported in an axial direction up towards the piston rod on the radial step of the piston rod. In this way the valve washer (3) is loaded with a predeterminable resilient force so that the valve washer (3) rises from the valve seat (10) only when a certain pressure is achieved and a through-flow channel for the liquid damping medium is opened. An arrow is marked in FIG. 3 to show the flow path of the damping medium during a compression stroke in normal operation.

In FIG. 3 it must also be recognised that the valve washer (3) cooperates with an annular washer (11) of the blow-off valve (4). The further the valve washer (3) is bent up in the direction of the piston rod, then the smaller is the freely through-flowable cross-section of the throttling site (5), which throttling site (5) is positioned between the valve washer (3) and the annular washer (11). A corresponding change of the damping force of the vibration damper is achieved by changing the freely through-flowable cross-section surface. If there is an increasing reduction of the freely through-flowable cross-section surface of the throttling site (5), the damping force of the vibration damper increases. In this way the desired progressive damping force in the range of high working piston speeds is achieved.

The pressure relief valve (4) with the blow-off function (blow-off valve) is formed in the exemplified embodiment illustrated in FIG. 3 by several component parts. On the one hand, a cover (12) is provided which cooperates with the body of the working piston (1). A circumferential sealing surface is formed on the working piston (1) on which sealing surface the cover (12) of the blow-off valve (4) is sealingly positioned.

On the inner wall of the cover (12) a step (13) is provided which extends inwards in a radial direction. The annular washer (11) is supported on this radial step (13) over a spacer ring (14) in axial direction. By careful selection of the axial thickness of the spacer ring (14), the progress of the gradual increase in the damping force of the vibration damper is influenced, since by way of the spacer ring (14), the maximum distance of the surface facing to the valve washer (3) of the annular washer (11) of the valve washer (3) is predeterminable in a closed position.

The cover (12) of the blow-off valve (4) is held by prestressing by a resilient force produced by a spring washer (15) on the working piston (1). This resilient force corresponds to the resilient force designated $F1_{resilient\ force}$ in FIGS. 2a, 2b. To produce this prestressing the spring washer (15) is clamped tight axially on its inner radial periphery in the area of the piston rod pin (7), whilst its outer periphery abuts two spacer washers (16, 17) which are disposed one on top of the other. The point of support of the spring washer (15) on the outer periphery (that is, in the area of the cover (12)) is thus positioned closer to the piston rod (8) than to the point at which the spring washer (15) is fixed in the area of the piston rod pin (7). In this way the spring washer (15) is thus made to flex so that it exerts an effective resilient force in closing direction of the blow-off valve (4) via the spacer washers (17, 16), the annular washer (11) and the spacer ring (14) on the cover (12). This prestressing holds the blow-off valve (4) in a closed position on the corresponding valve seat of the working piston (1). Only when a specific pressure that is dependent on the deflexion of this spring washer (15) is achieved in the vibration damper will the blow-off valve (4) open against the resilient force of the spring washer (15) and release the flow path for the liquid damping medium shown with an arrow in FIG. 4. By changing the axial height of the spacer washers (16, 17) arranged one on top of the other, the preload force of the blow-off valve, and thus its opening pressure, can be purposefully adjusted.

Figure 4:
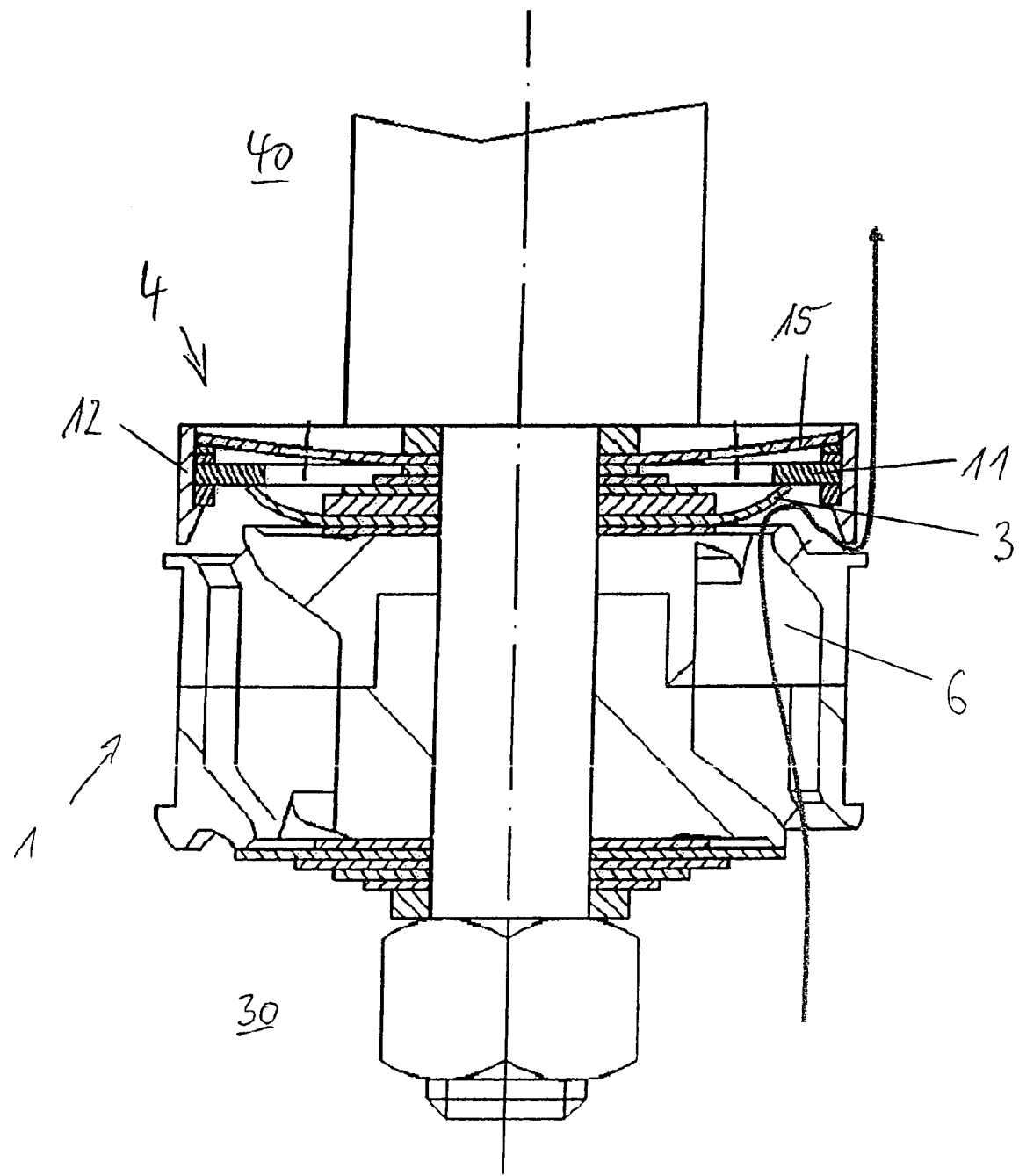
FIG. 4 shows the valve device in accordance with FIG. 3 in another operating state (blow-off function)

In FIG. 4 a maximum flexing of the valve washer (3) is shown in which the throttling site (5) (cf FIG. 3) is reduced to nil. This is to show diagrammatically that the flexing of the valve washer (3) has achieved a critical mass with which the free through-flow cross-section of the throttling site (5) (see FIG. 3) has achieved such a small mass that the throttle effect of the throttling site (5) is so great that a critical pressure is achieved in the vibration damper at which the blow-off valve (4) opens. This can also be the case before the valve washer (3) physically abuts the annular washer (11). To achieve the opening pressure of the blow-off valve it is thus not necessary for the valve washer (3) to be positioned on the annular washer (11).

If this critical level of pressure is achieved in the vibration damper, then the cover (12) is raised from its valve seat surface on the working piston (1) and releases a flow path for the liquid damping medium (blow-off function).

If this blow-off function of the pressure limiting valve (4) is triggered then this will prevent a further increase of the damping force, and the level of damping force of the vibration damper will remain at a constant high level, of Range 2 in FIG. 1.

Figure 5:
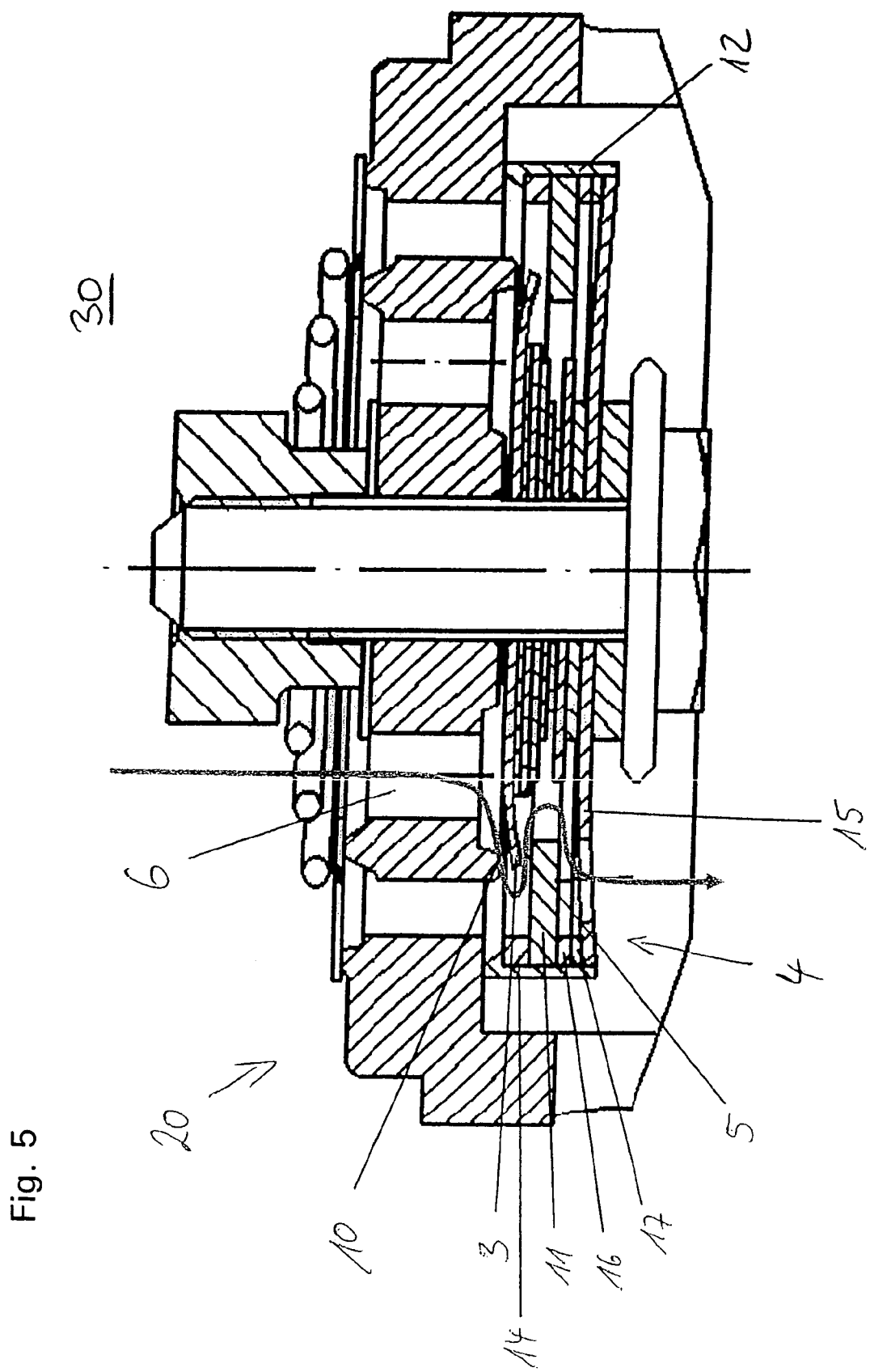
FIG. 5 shows a bottom valve with a valve device in accordance with the invention in a first operating state (normal operation)

FIG. 5 shows the same operating principle of the valve device in accordance with the invention, in the same way as this is shown in FIG. 3 on the example of a valve formed on the working piston (1). The only difference is that in FIG. 5, a valve device in accordance with the invention is shown which is formed on a bottom valve (20). Similar component parts are thus shown in FIG. 5 with the same reference marks.

With the normal operating conditions shown in FIG. 5, the valve device in accordance with the invention is disposed, just as in FIG. 3, so that it covers a through-flow channel (6) through which the liquid damping medium flows as the working piston (1) moves in the direction of the pressure chamber (30) (compression stroke). The valve washer (3) is lifted from the valve seat (10) against its prestressing force by a certain degree so that the fluid damping medium flows through the channel (6) to the valve washer (3) and through the freely through-flowable cross-section of the throttling site (5). The variable throttling site (5) is in turn formed between the valve washer (3) and the annular washer (11), and by changing the variable throttling site (5), the desired progressive damping force is achieved when there are high working piston speeds.

Figure 6:
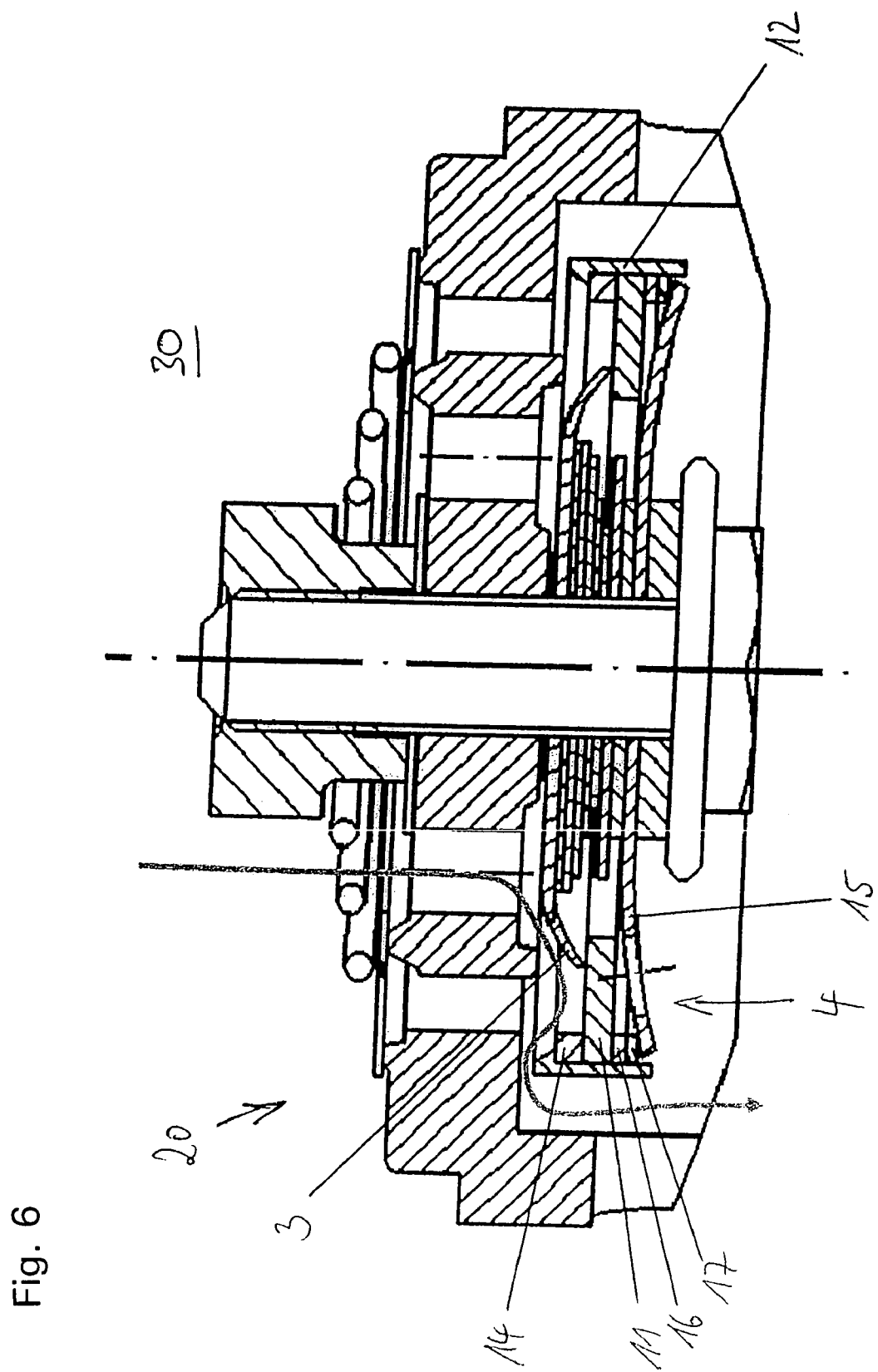
FIG. 6 shows the valve device in accordance with FIG. 5 in another operating state (blow-off function).

In FIG. 6 the bottom valve (20) which is equipped with the valve device in accordance with the invention in accordance with FIG. 5 is shown in another operating state. The valve washer (3) has flexed to such an extent that the freely through-flowable cross-section of the throttling site (5) (FIG. 5) has reduced to nil. The pressure in the vibration damper has thus increased to a critical level at which the cover (12) of the blow-off valve (4) is raised from the valve seat surface shown on the body of the bottom valve (20). A flow pathway for the liquid damping medium is thus released so that a further increase of the damping force at even higher working piston speeds is effectively avoided. The damping force remains almost constantly at a specific high level of damping force.

The valve device in accordance with the invention can be formed exclusively on the working piston (1) of the vibration damper, as is shown in FIGS. 3 and 4. The valve device in accordance with the invention can also be disposed exclusively on the bottom valve (20), as is shown in FIGS. 5 and 6. It is of course also possible to provide the valve device in accordance with the invention both on the working piston (1) and also at the same time on the bottom valve (20).

In the exemplified embodiment shown in the drawing, the valve device in accordance with the invention is disposed in such a way that it is effective in the pushing stage of the vibration damper. In a similar manner, the valve device in accordance with the invention could however also be disposed so that it is effective in the pulling stage of the vibration damper. Furthermore, it would also be conceivable to position the valve device in accordance with the invention both in the pulling stage and in the pushing stage.

LIST OF TERMS FOR REFERENCE

1. Working piston
2. Receiving pipe
3. Valve washer
4. Pressure relief valve (blow-off valve)
5. Throttling site
6. Through-flow channel
7. Piston rod pin
8. Piston rod
9. Nut
10. Valve seat
11. Annular washer
12. Cover
13. Step
14. Spacer ring
15. Spring washer
16. Spacer washer
17. Spacer washer
20. Bottom valve
30. Pushing chamber
40. Pulling chamber
$F1_{resilient\,force}$ Resilient force
$F2_{resilient\,force}$ Resilient force

The invention claimed is:

1. A hydraulic vibration damper, comprising:
a receiving pipe;
a piston rod;
a working piston being disposed on an end of the piston rod being received within the receiving pipe in a manner allowing oscillatory axial movement of the working piston within the receiving pipe, said working piston respectively dividing an inner chamber of the receiving pipe into a pulling chamber on a side occupied by the piston rod and a pushing chamber on another side remote from the piston rod, said working piston comprising through-flow channels effective for conducting a flow of damping fluid across said working piston when said working piston is moved in a pulling direction or a pushing direction;
a damping valve including a first valve seat and a first valve washer cooperative with said first valve seat, said first valve washer being biased by a first damping resilient force in a direction of said first valve seat to cover at least a first one of said through-flow channels which is present in said valve seat, said damping valve opening when a first predetermined damping fluid pressure exceeds the first damping resilient force in a direction opposite thereto; and
a pressure relief blow-off valve comprising a first annular washer having a surface facing the first valve washer, said first annular washer being biased in a closed position by a pressure relief resilient force greater than said first damping resilient force and which opens when a second predetermined damping fluid pressure exceeds said pressure relief resilient force, said surface of said first annular washer forming a variable first throttling site with the first valve washer, said first throttling site presenting a throttling cross-section which is variable depending on a range of piston speeds of the vibration damper in such manner that an increase in said throttling cross-section is attendant an initial increase in piston speed following said first damping resilient force being exceeded, and that a decrease in said throttling cross-section is attendant a further increase in piston speed beyond said initial increase, such that as said further increase in piston speed progresses, the damping fluid pressure continues to increase until said pressure relief blow-off valve opens when the damping fluid pressure exceeds the pressure relief resilient force thereby preventing the damping fluid pressure from significantly increasing beyond said second predetermined damping fluid pressure attendant an increase in the piston speed beyond a threshold piston speed present when said pressure relief resilient force is exceeded by the damping fluid pressure thereby protecting the vibration damper against cracking due to excessively high pressure levels which would otherwise develop.

2. The hydraulic vibration damper as claimed in claim 1, wherein at least one through-flow channel is coverable by the first valve washer, through which channel damping fluid flows in the direction of the pushing chamber as the piston rod moves in the pulling direction.

3. The hydraulic vibration damper as claimed in claim 1 or 2, wherein a bottom valve, having through-flow channels for the damping fluid which are effective in the pulling direction and the pushing direction, is disposed on an end of the receiving pipe which lies opposite an exit side of the piston rod.

4. The hydraulic vibration damper as claimed in claim 3, wherein the bottom valve comprises:
a second damping valve including a resilient or spring loaded second valve washer; and
a second blow-off valve including a second annular washer having a second surface facing the second valve washer, said second surface forming a variable second throttling site with the second valve washer which influences a progressive increase of the damping force when there are increasing piston speeds.

5. The hydraulic vibration damper as claimed in claim 4, wherein at least one through-flow channel can be covered by the second valve washer through which damping liquid flows in the direction of the pushing chamber as the piston rod moves in the pulling direction.

6. The hydraulic vibration damper as claimed in claim 3, wherein a valve seat surface, with which the blow-off valve cooperates, is formed on at least one of the body of the working piston or on the body of the bottom valve.

7. The hydraulic vibration damper as claimed in claim 1 or 2, wherein the first valve washer and the blow-off valve are disposed on the working piston.

8. The hydraulic vibration damper as claimed in claim 1 or 2, wherein the blow-off valve is formed as a spring loaded pressure relief valve.

9. The hydraulic vibration damper as claimed in claim 1, wherein:
said pressure relief blow-off valve further comprises a cover with a step disposed on an inner wall of the cover, extending inwards, which forms an abutment for the annular washer,
a spring washer is disposed within the cover and above the step,
said spring washer has a central bore and is fixed in place axially in the area of said central bore, and
the spring washer is supported directly or indirectly at the step at an outer periphery of the spring washer creating a resilient force effective in the closed direction of the blow-off valve.

10. The hydraulic vibration damper as claimed in claim 9, wherein the annular washer which cooperates with the valve washer is disposed between the valve washer and the spring washer.

11. The hydraulic vibration damper as claimed in claim 10, wherein the annular washer is supported using at least a spacer ring on the step of the cover.

12. The hydraulic vibration damper as claimed in claim 11, wherein the spring washer is supported on the annular washer using at least one spacer ring, which is disposed between the spring washer and the annular washer.

* * * * *